UNITED STATES PATENT OFFICE.

CHAS. G. ANGEROTH, JR., OF PHILADELPHIA, PENNSYLVANIA.

TREATING MOSS FOR MATTRESSES, &c.

Specification forming part of Letters Patent No. 43,962, dated August 30, 1864.

*To all whom it may concern:*

Be it known that I, C. G. ANGEROTH, Jr., of Philadelphia, Pennsylvania, have invented a Mode of Treating Moss; and I do hereby declare the following to be a full, clear, and exact description of the same.

My invention consists in the mode, described hereinafter, of treating the moss which has been heretofore used for stuffing cushions, &c., so as to make it equal or nearly equal to curled hair for the above purpose.

In order to enable others to practice my invention I will now proceed to describe the manner of carrying it into effect.

The moss to the treatment of which my invention more especially appertains has been termed "long moss," is known by botanists as the "*Tillandsia usneoides*," and in commerce is known by the simple term of "moss." It is a parasite clinging to trees throughout the Southern States and tropical South America.

The moss when dried is beaten until the bark flies off. The cartilaginous hair-like flexible stems are packed in bales and exported to the Northern States, where the moss is used as a cheap substitute for curled hair in stuffing cushions, chairs, saddles, &c. I take a mass of this moss—say, one hundred pounds—and dye it black by steeping it in a decoction of logwood, about ten pounds of the latter being required to dye the above-mentioned quantity of the moss. After the mass of fibers has been dried I remove whatever particles of bark may adhere to the moss by steeping it in a decoction of copperas, one-quarter of a pound of which dissolved in water will suffice for one hundred pounds of moss. I then steep the mass of fibers in a thin sizing composed of gum-arabic or glue dissolved in water, this imparting a stiffness and elasticity to the fibers. The moss is now ready to be subjected to the treatment by which it is curled. I take about one pound of alum and dissolve it in water sufficient to form a bath for one hundred pounds of the moss, the fibers of which, on being steeped in the fluid, at once curl and become twisted into a mass bearing such a strong resemblance, both as regards appearance and quality, to curled hair that it is a difficult matter to distinguish one from the other.

I claim as my invention and desire to secure by Letters Patent—

Treating moss with alum as set forth, for the purpose specified.

In testimony whereof I have signed my name to this specification in the presence of two subscribing witnesses.

CHARLES G. ANGEROTH, JR.

Witnesses:
 CHARLES E. FOSTER,
 JOHN WHITE.